United States Patent
Zheludkov

(10) Patent No.: US 10,136,131 B2
(45) Date of Patent: Nov. 20, 2018

(54) VIDEO CODING APPARATUS AND METHOD

(71) Applicant: Beamr Imaging Ltd., Tel-Aviv (IL)

(72) Inventor: Alexander Zheludkov, Saint-Petersburg (RU)

(73) Assignee: BEAMR IMAGING LTD., Tel Aviv (IL)

( * ) Notice: Subject to any disclaimer, the term of this patent is extended or adjusted under 35 U.S.C. 154(b) by 166 days.

(21) Appl. No.: 15/254,565

(22) Filed: Sep. 1, 2016

(65) Prior Publication Data

US 2017/0078663 A1 Mar. 16, 2017

Related U.S. Application Data

(60) Provisional application No. 62/217,089, filed on Sep. 11, 2015.

(51) Int. Cl.
  *H04N 7/12*    (2006.01)
  *H04N 19/119*  (2014.01)
  *H04N 19/124*  (2014.01)
  *H04N 19/593*  (2014.01)

(52) U.S. Cl.
  CPC ......... *H04N 19/119* (2014.11); *H04N 19/124* (2014.11); *H04N 19/593* (2014.11)

(58) Field of Classification Search
  CPC ...... H04N 19/50; H04N 19/82; H04N 19/176; H04N 19/567; B29B 11/14
  USPC ............. 375/240.03, 240.02, 240.12, 240.13
  See application file for complete search history.

(56) References Cited

U.S. PATENT DOCUMENTS

| | | | |
|---|---|---|---|
| 2012/0082224 A1* | 4/2012 | Van Der Auwera | ......................... H04N 19/176 375/240.12 |
| 2013/0182759 A1* | 7/2013 | Kim | ....................... H04N 19/82 375/204.02 |
| 2014/0105290 A1* | 4/2014 | Kwon | ..................... H04N 19/50 375/240.12 |
| 2015/0085921 A1* | 3/2015 | Chou | .................... H04N 19/176 375/240.03 |
| 2015/0103910 A1* | 4/2015 | Kwon | .................. H04N 19/567 375/240.13 |
| 2017/0341281 A1* | 11/2017 | Branch | ................... B29B 11/14 |

* cited by examiner

*Primary Examiner* — Gims S Philippe
(74) *Attorney, Agent, or Firm* — Browdy and Neimark, P.L.L.C.

(57) ABSTRACT

By one approach a control circuit receives video information to be encoded, uses a particular rounding control value when processing the video information, and detects when color banding occurs when processing the video information using the particular rounding control value and responsively reprocesses the video information using a different rounding control value. By another approach, the control circuit has a plurality of different intra prediction types, including a planar intra prediction type, available to use when encoding the video information and wherein the control circuit determines when the planar intra prediction type can be employed without testing use of all of the plurality of different intra prediction types. By yet another approach, the control circuit selects block coding parameters, at least in part, by comparing corresponding mode costs, detects a smooth area in the video information, and then modifies mode costs as a function of having detected the smooth area.

18 Claims, 3 Drawing Sheets

… (1)

VIDEO CODING APPARATUS AND METHOD

RELATED APPLICATION(S)

This application claims the benefit of U.S. Provisional Application No. 62/217,089, filed Sep. 11, 2016 and entitled SYSTEM AND METHOD FOR VIDEO CODING WITH VISUAL ARTIFACTS REDUCTION AND SIMPLIFIED INTRA DECISION, which is incorporated by reference in its entirety herein.

TECHNICAL FIELD

These teachings relate generally to video coders.

BACKGROUND

Video content can constitute a considerable quantity of data. As a result, transmission bandwidth requirements can be considerable as well. To avoid unduly burdening the applicable communications infrastructure and link, it is known in the art to digitally encode the video content and to then compress that digital representation prior to transmission. Compressing the content, in turn, results in reducing the literal size of the data to be transmitted and hence reduces the bandwidth requirements. High Efficiency Video Coding (HEVC), also known as H.265, is an example of a newer video compression standard that may succeed the widely used Advanced Video Coding (AVC) standard (H.264 or MPEG-4 Part 10).

Unfortunately, compression also can lead to a loss of information and/or an introduction of artifacts that detract from the viewing experience upon decompressing and viewing the video content. Useful techniques that ameliorate such problems unfortunately also sometimes require a consideration amount of processing power and/or time. Such requirements in turn can contribute to implementing platforms that are relatively costly or that are simply underpowered in some application settings and hence unable to effectively yield satisfactory results.

BRIEF DESCRIPTION OF THE DRAWINGS

The above needs are at least partially met through provision of the video coding apparatus and method described in the following detailed description, particularly when studied in conjunction with the drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, these embodiments provide a control circuit that can effectively address one or more such issues. By one approach, for example, the control circuit is configured to receive video information to be encoded, use a particular rounding control value when processing the video information, and detect when color banding occurs when processing the video information using the particular rounding control value and responsively reprocess the video information using a different rounding control value. By another approach, in lieu of the foregoing or in combination therewith, the control circuit has a plurality of different intra prediction types, including a planar intra prediction type, available to use when encoding the video information and wherein the control circuit is further configured to determine when the planar intra prediction type can be employed without testing use of all of the plurality of different intra prediction types. And by yet another approach, again in lieu of the foregoing or in any combination therewith, the control circuit is configured to select block coding parameters, at least in part, by comparing corresponding mode costs, detect a smooth area in the video information, and then modify mode costs as a function of having detected the smooth area.

Any and all of these approaches permit a control circuit to provide satisfactory results under a variety of application settings, often while using considerably less computational power and/or processing time to achieve those results. So configured, an implementing device that operates on battery power can provide good results with less power consumption over time and can thus achieve a longer battery life.

Figure 1:
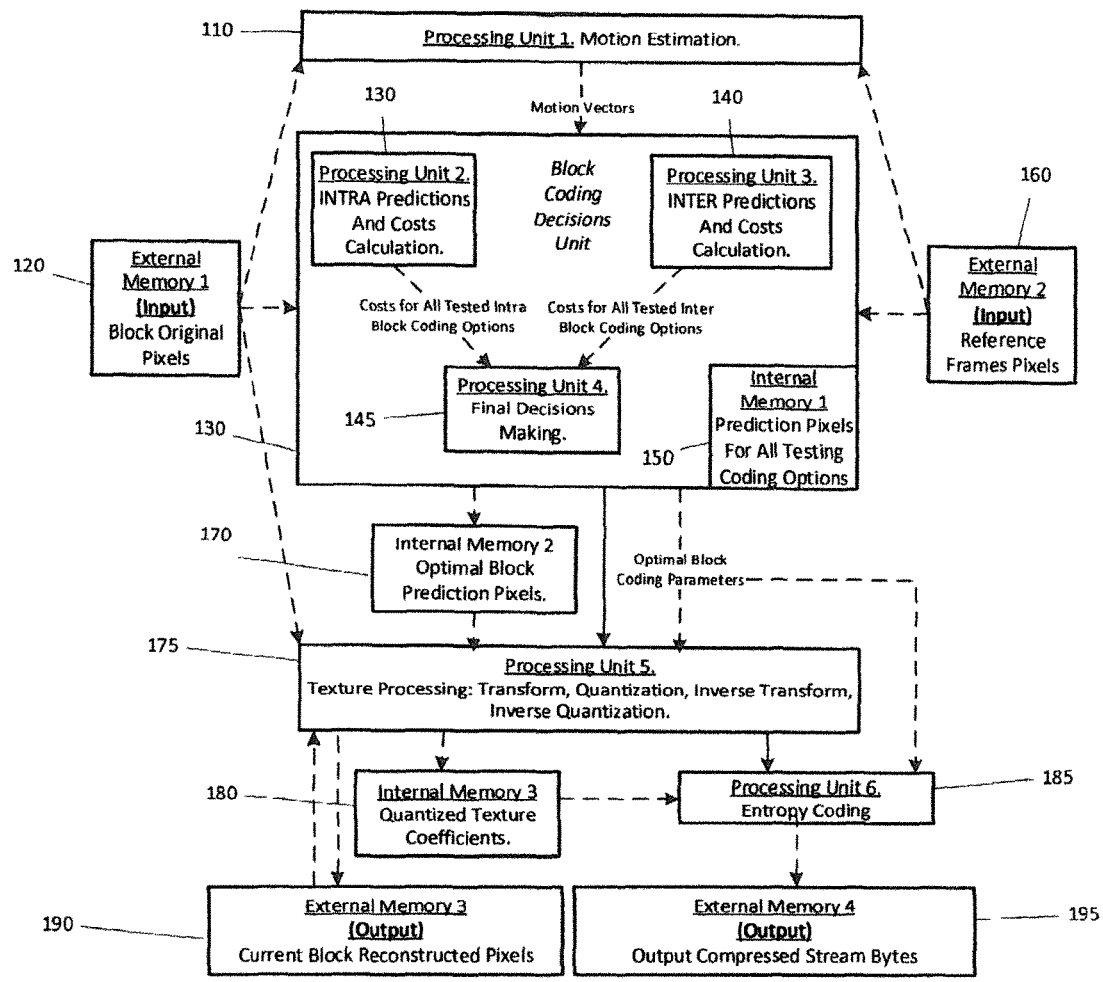
FIG. 1 comprises a block diagram as configured in accordance with various embodiments of these teachings.

These and other benefits may become clearer upon making a thorough review and study of the following detailed description. Referring now to the drawings, FIG. 1 presents a block diagram depiction of a block coding control circuit 100. Being a "circuit," this control circuit 100 therefore comprises structure that includes at least one (and typically many) electrically-conductive paths (such as paths comprised of a conductive metal such as copper or silver) that convey electricity in an ordered manner, which path(s) will also typically include corresponding electrical components (both passive (such as resistors and capacitors) and active (such as any of a variety of semiconductor-based devices) as appropriate) to permit the circuit to effect the control aspect of these teachings.

Such a control circuit 100 can comprise a fixed-purpose hard-wired hardware platform (including but not limited to an application-specific integrated circuit (ASIC) (which is an integrated circuit that is customized by design for a particular use, rather than intended for general-purpose use), a field-programmable gate array (FPGA), and the like) or can comprise a partially or wholly-programmable hardware platform (including but not limited to microcontrollers, microprocessors, and the like). These architectural options for such structures are well known and understood in the art and require no further description here. This control circuit 100 is configured (for example, by using corresponding programming as will be well understood by those skilled in the art) to carry out one or more of the steps, actions, and/or functions described herein.

In this example the control circuit 100 includes or otherwise operably couples to one or more memories (as described in more detail below). Such memory may be integral to the control circuit 100 or can be physically discrete (in whole or in part) from the control circuit 100 as desired. This memory can also be local with respect to the control circuit 100 (where, for example, both share a common circuit board, chassis, power supply, and/or housing) or can be partially or wholly remote with respect to the control circuit 100 (where, for example, the memory is physically located in another facility, metropolitan area, or even country as compared to the control circuit 100).

This memory can serve, for example, to non-transitorily store the computer instructions that, when executed by the control circuit 100, cause the control circuit 100 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).)

Generally speaking, the input of the control circuit 100 consists of encoding settings, original picture texture, and reference pictures data while the output of the control circuit 100 consists of the reconstructed texture block and compressed stream bytes.

In this particular illustrative embodiment the control circuit 100 connects or to a number of external memory blocks, including External Memory 1 (120) for the storage of the original texture of the encoded picture, External Memory 2 (160) for the storage of the reference frames pixels, External Memory 3 (190) that receives the reconstructed block pixels, and External Memory 4 (195) that receives the compressed output stream bytes. In this example the first two external memory blocks 1 and 2 (120 and 160) are non-volatile (read-only) memory that store the input data of the control circuit 100.

In this example the control circuit 100 also contains the following internal volatile memory blocks. An Internal Memory 1 (150) for the internal storage of the prediction pixels for all coding options tested during optimal block parameters calculation, and Internal Memory 2 (170) for the internal storage of block prediction pixels for optimal block coding parameters, and an Internal Memory 3 (180) for the internal storage of the quantized texture prediction residual transform coefficients.

So provisioned, the control circuit 100 is generally configured as follows. Having some variety of the possible block coding modes (intra with different intra prediction modes, inter with various subdivisions into independently inter-predicted sub-blocks, and so forth.) the control circuit 100 tests all or part of them, calculating the corresponding block texture prediction pixels and coding mode costs. This testing of the possible coding options is performed separately for Intra coding mode (in Processing Unit 2 (130)) and for Inter coding modes (in Processing Unit 3 (140)). For inter predictions motion vectors calculation motion estimation procedure is carried out in Processing Unit 1 (110). The results of calculations in Processing Units 2 and 3 are transmitted to Processing Unit 4 (145) where final optimal blocks coding parameters are selected based on the corresponding costs and prediction pixels. Using optimal block coding parameters and the block texture prediction pixels, full block texture processing is carried out in the Processing Unit 5 (175); the output of the Processing Unit 5 consists of the quantized texture prediction residual transform coefficients and the reconstructed block texture. Finally, entropy coding of the block coding parameters and quantized texture coefficients is performed in Processing Unit 6 (185).

Further elaboration in the foregoing regards will now be provided with respect to a number of particular points of interest.

Fast Planar Intra Mode Suitability Analysis

Planar intra mode is one of the intra prediction types used in H.264 and HEVC video encoding. According to experiments with HEVC coding, planar intra prediction type is the most "universal" intra prediction mode, which can be used more often than any other intra prediction mode with only minor losses of compression efficiency. Because the full procedure for intra prediction mode determination is quite complicated (and therefore consumes more computational resources and computing time than other mode evaluations), these teachings provide an approach for distinguishing the texture blocks that suit planar intra prediction usage without appreciable compression efficiency decrease with respect to the optimal intra prediction. Use of this approach provides significant intra mode decision complexity reduction and hence an improvement with respect to the ability of an existing technology platform to successfully be employed in these regards.

Figure 2:
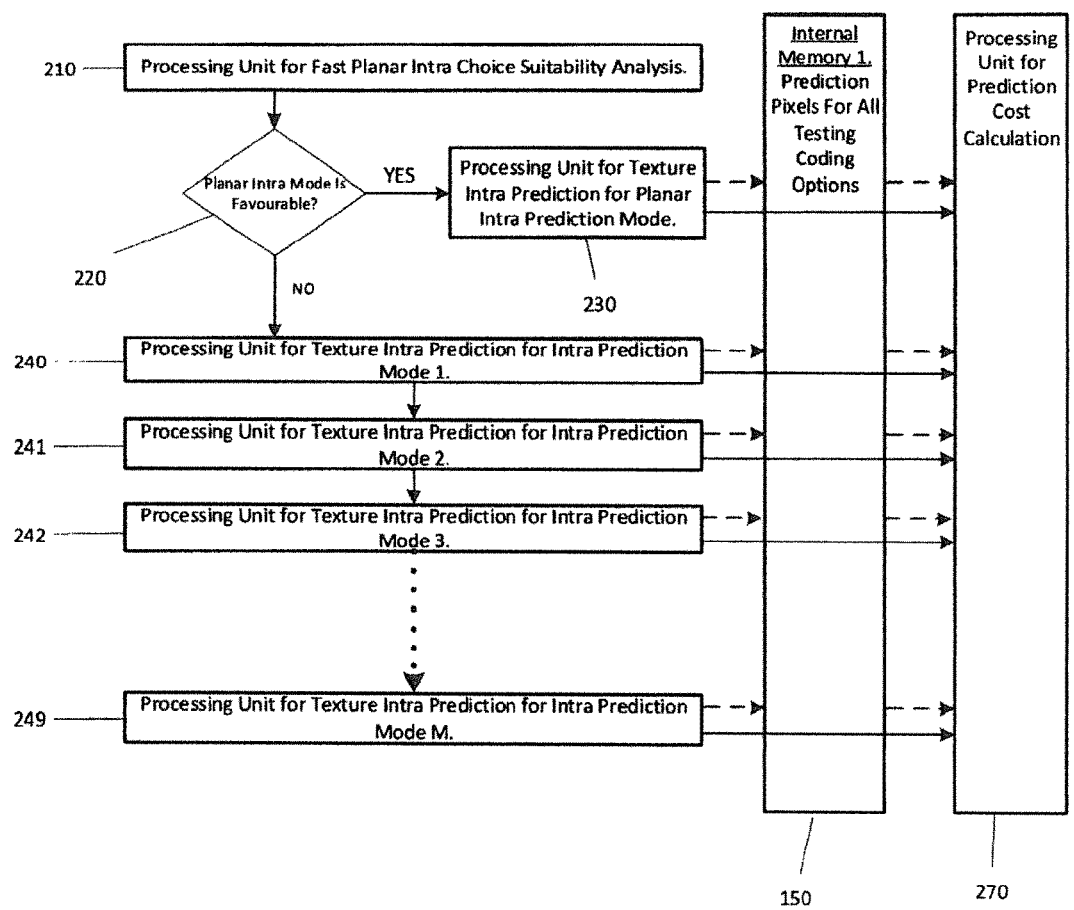
FIG. 2 comprises a flow diagram as configured in accordance with various embodiments of these teachings.

In this particular example a fast planar intra choice suitability analysis processing unit is integrated into the control circuit 100 as a part of Processing Unit 2. In a simple optimal intra prediction processing unit, all or part of the intra coding modes are tested and the corresponding prediction pixels and costs are computed. In the proposed processing unit for fast planar intra choice suitability analysis, the control circuit 100 may avoid processing the full intra modes testing set. FIG. 2 presents a simplified illustration of such a processing unit, comprising a processing unit for fast planar intra choice suitability analysis shown in 210, the output of which enables determining, in block 220, whether planar intra prediction mode may be used for coding a given texture block, without additionally checking the other intra prediction modes and thus saves considerable processing time.

We now present an exemplified implementation of block 210 performing processing for fast planar intra choice suitability analysis.

For the purposes of this description all pixel luminance values are assumed to have bit depth 8. Pixel luminance values having a bit depth other than 8 can be scaled to bit depth 8 before applying the calculations below. All array indexing starts from zero.

Let P be a two-dimensional N×N array of texture block luminance component values $P(j,k)$ where $j,k=0 \ldots N-1$.

Let $$DX(x, y) = \frac{\sum_{k=0}^{8}\sum_{j=0}^{8} P(4*(x+1)+j, 4*y+k) - \sum_{k=0}^{8}\sum_{j=0}^{8} P(4*x+j, 4*y+k)}{16}$$

$$DY(x, y) = \frac{\sum_{k=0}^{8}\sum_{j=0}^{8} P(4*x+j, (4*y+1)+k) - \sum_{k=0}^{8}\sum_{j=0}^{8} P(4*x+j, k)}{(16)}$$

$$DXX = \sum_{k=0}^{N-1} \sum_{j=0}^{N-1} (P(j+1, k) - P(j-1, k))^2$$

-continued $$DYY = \sum_{k=0}^{N-1} \sum_{j=0}^{N-1} (P(j, k+1) - P(j, k-1))^2$$

$$DXY = \sum_{k=0}^{N-1} \sum_{j=0}^{N-1} (P(j+1, k) - P(j-1, k)) * (P(j, k+1) - P(j, k-1))$$

$$Cmpl = \sum_{y=0}^{\frac{N}{4}-1} \sum_{x=0}^{\frac{N}{4}-1} DX(x, y)^2 + DY(x, y)^2$$

$$V0 = \text{round}\left(\frac{20 * |DXX - DYY|}{(DXX + DYY)}\right)$$

$$V1 = \text{round}\left(\frac{40 * |DXY|}{(DXX + DYY)}\right)$$

$$AngleStrength = \sqrt{V0^2 + V1^2}$$

An example of the Planar intra prediction decision module, shown in block 220, is that Planar intra prediction may be used for block P encoding if the following inequality holds:

AngleStrength<$T(Cmpl,N)$.

The threshold function T(Cmpl,N) is a parameter to the algorithm. According to experiments, it may be calculated as follows.

Consider the following arrays and their respective sizes:
Scale={84, 84, 84, 84, 14, 3, 3}, size=7
CL={0,1,1,1,1,1,1,2,2,2,2,2,2,2,3,3,3,3,3,3,3,3,3,3,3, 3,3,3,3,3,3,4,4,4,4,4, 4,4,4,4,4,4,4,4,4,4,4,4,4,4,4,4,4,4,4, 4,4,4,4,4,4,4,4,5,5,5,5,5,5,5,5,5, 5,5,5,5,5,5,5,5,5,5, 5,5,5,5,5,5,5,5,5,5,5,5,5,5,5,5,5,5,5,5,5,5,5,5,5, 5,5,5,5, 5,5,5,5,5,6,6,6,6,6,6,6,6,6,6,6,6,6,6,6,6,6,6,6,6,6,6, 6,6,6, 6,6,6,6,6,6,6,6,6,6,6,6,6,6,6,6,6,6,6,6,6,6,6,6,6,6, 6,6,6,6,6,6,6,6,6,6,6, 6,6,6,6,6,6,6,6,6,6,6,6,6,6,6,6,6,6, 6,6,6,6,6,6,6,6,6,6,6,6,6,6,7,7, 7,7,7,7,7,7,7,7,7,7,7, 7,7,7,7,7,7,7,7,7,7,7,7,7,7,7,7,7,7,7,7, 7,7,7,7,7, 7,7,7,7,7,7,7,7,7,7,7,7,7,7,7,7,7,7,7,7,7,7,7,7, 7,7, 7,7,7,7,7,7,7,7,7,7,7,7,7,7,7,7,7,7,7,7,7,7,7,7,7, 7,7,7,7,7,7,7,7, 7,7,7,7,7,7,7,7,7,7,7,7,7,7,7,7,7,7, 7,7,7,7,7,7,7,7,7,7,7,7,7,7, 7,7,7,7,7,7,7,7,7,7,7,7, 7,7,7,7,7,7,7,7,7}, size=383
B={-1,0,6,12,30,61,117,213,382,677,1194,2099,3682, 6453,11302,19788,34638}, size=17
T8={16,19,11,10, 6,7,8,7,9,10,5,9,11,14,13,12,12}, size=17
T16={19,19,19,9,12,9,10,9,9,8,9,8,7,9,10,13,9}, size=17
T32={19,19,19,19,19,19,6,6,7,5,4,10,10,9,7,12,14}, size=17

Finally, let TN be an array of the size 17 which is set to T8 if N≤8, to T16 if N=16 and to T32 otherwise. Let $CmpS = \text{round}(Cmpl * Scale[\text{round}(\log_2 N)]/14)$, Define index d to be 16 if CmpS>B[16] and to satisfy the condition B[d]≤CmpS<B[d+1] otherwise. Then the threshold function is defined as $$T(Cmpl, N) = \begin{cases} TN[CL[CmpS]], & CmpS < 383 \\ TN[d], & CmpS \geq 383 \end{cases}.$$

If the decision is that Planar mode is favorable we proceed to block 230 to perform the processing, and can avoid the processing of blocks 240-249. If, however, Planar mode was found to not be advised for the block, further intra prediction processing modes are analyzed in the processing nits for texture mode decisions depicted in blocks 240-249.

Once the texture prediction analysis is complete, using either the Planar mode selected in the optimized early selection manner, or one of the other M modes, we proceed to perform the actual prediction in block 150, followed by mode cost calculation in block 270.

Color Banding Detection and Elimination

Color banding (gradient) is a well-known digital image visual defect. In video encoding it may occur as a lossy video compression artifact when the compression and reconstruction procedure erases dithering and other fine details of the image. These teachings will accommodate configuring the control circuit 100 to reduce color banding in the reconstructed image after video encoding.

Figure 3:
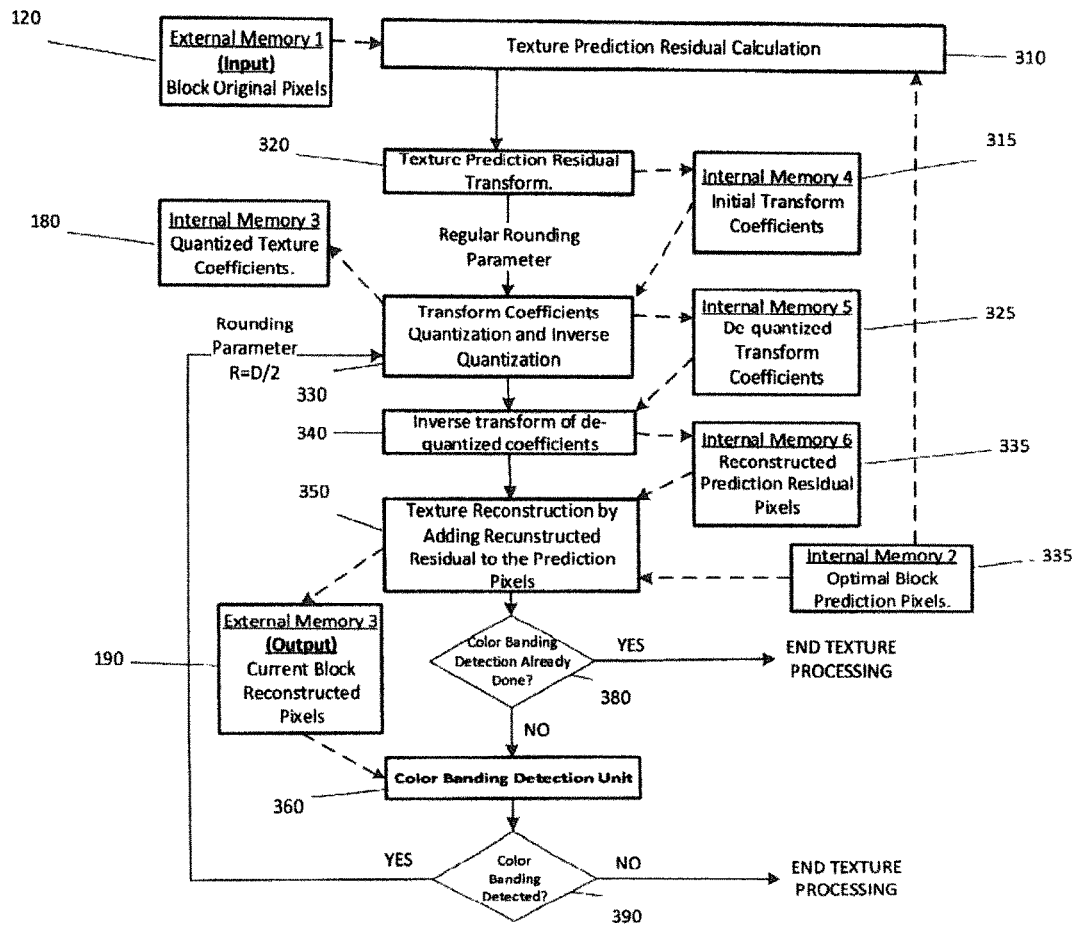
FIG. 3 comprises a flow diagram as configured in accordance with various embodiments of these teachings.

By one approach the color banding detection and elimination processing unit is integrated into the control circuit 100 as a part of Processing Unit 5. FIG. 3 presents one approach to a corresponding configuration in these regards. The color banding detection unit can be utilized in reconstructed texture analysis. By one approach part of texture processing (namely, quantization, inverse quantization and the texture reconstruction) is repeated with another rounding control value if the banding is detected.

In many block-based video compression methods (H.264, HEVC, etc.) quantization of texture prediction residual transform coefficients for the given quantization parameter is done as follows:

$$C_{quantized} = \frac{C_{init} * M + R}{D}.$$

In the expression above all the variables are integer-valued and the division operation is done with rounding to the nearest smaller integer. The values of M and D correspond to the dequantization procedure for the given quantization parameter value. The rounding parameter R minimizes the texture reconstruction error and is equal to $$\frac{D}{2}.$$

However, for rate-distortion optimization it is usually set to $$\frac{D}{8}, \frac{D}{6}$$

or some other value that is much less than $$\frac{D}{2}.$$

Observations show that visual artifacts in some of the reconstructed video spatial areas are caused by using this "rate-distortion optimizing" rounding parameter (which differs from $$\left.\frac{D}{2}\right)$$

in those areas. However, using rounding parameter $$\frac{D}{2}$$

for all the transform blocks also leads to quality degradation. By one approach the present teachings can resolve that conundrum (at least in many application settings).

This process provides for performing usual texture block processing including texture prediction and residual computation at block 310, texture prediction residual transform at block 320, transform coefficients quantization and inverse quantization at block 330, inverse transform of de-quantized coefficients at block 340, and calculation of the reconstructed texture by adding the result of the inverse transform to the texture prediction at block 350. (In the present example it will be presumed that the rounding parameter value for the quantization procedure is chosen based on rate-distortion optimization.) Generally speaking, these actions are understood in the art and require no further elaboration here.

As illustrated, the texture processing concludes in this example upon determining (at block 380) that color banding detection has concluded. Color banding is detected, in turn, at block 360 by a color banding detection unit that analyzes current blocks of reconstructed pixels for signs of color banding. In the absence of color banding at block 390, the process concludes texture processing. When potential color banding artifacts are detected, however, in the given texture block then this process provides for re-quantizing (at above-described block 330) this block using rounding parameter D/2. This means that for the block under consideration the following steps of the encoder texture processing are redone: quantization of the residual transform coefficients with rounding parameter D/2 and inverse quantization at block 330, inverse transform at block 340, and adding the results of the inverse transform to the texture prediction at block 350.

By one approach the color circuit 100 is configured to embody the color banding detection unit as follows.

All pixel luminance values are assumed to have bit depth 8. If they have bit depth other than 8 they can be scaled to bit depth 8 before applying the calculations below. All array indexing starts from zero.

Let P be a two-dimensional N×N array of texture block luminance component values P(j,k) where j=0 . . . N−1, k=0 . . . N−1.

Let $$dX(j,k)=P(j+1,k)-P(j,k) \text{ and } dY(j,k)=P(j,k+1)-P(j,k)$$

be horizontal and vertical gradient values for coordinates (j,k) for j,k=0 . . . N.

Let
$S_1$ be the set of index pairs (j,k) for which $|dX(j,k)| \leq 1$ and $|dY(j,k)| \leq 1$ for j,k=0 . . . N
$S_2$ be the set of index pairs (j,k) for which $|dX(j,k)| > 1$ or $|dY(j,k)| > 1$ for j, k=0 . . . N
$N_1$ be the number of elements in $S_1$
$N_2$ be the number of elements in $S_2$ $$DX = \sum_{(j,k) \in S_1} (P(j+1,k) - P(j,k))$$

$$DY = \sum_{(j,k) \in S_1} (P(j,k+1) - P(j,k))$$

$$D2X = \sum_{(j,k) \in S_1} (P(j+1,k) - P(j,k))^2$$

$$D2Y = \sum_{(j,k) \in S_1} (P(j,k+1) - P(j,k))^2$$

$$V = \frac{N_1 \cdot D2X - DX^2}{N_1^2 - N_1} + \frac{N_1 \cdot D2Y - DY^2}{N_1^2 - N_1}$$

$$A = \frac{DX^2 + DY^2}{N_1^2}$$

$$AvgS = \frac{\sum_{k=m}^{N-1-m} \sum_{j=m}^{N-1-m} P(j,k)}{(N-2m)^2}$$

where m is pre-defined nonnegative number such that $$m < \frac{N}{2}$$

(see below).

Per this example a block P is considered to have potential color banding artifacts if and only if all of the following conditions are satisfied:
$AvgS \geq C_1$
$AvgS \leq C_2$
$N_2 < C_3$
$(F(AvgS) < C_4)$ OR $(A \neq 0)$ OR $(AvgS > C_5)$
$A < F(AvgS)$ and
$V < G(A)$ The expression for computing AvgS includes one pre-defined constant m; the six conditions specified above include five pre-defined constants $C_1, C_2, C_3, C_4$, and $C_5$ and two pre-defined functions F(AvgS) and G(AvgS). These pre-defined constants and functions are the parameters of the algorithm.

Besides the algorithm itself, it is proposed to use the following values for the algorithm parameters and functions.

$$m = \frac{N}{4},$$

$C_1 = 22,$ $C_2 = 82,$ $C_3 = 9$ if $N > 30$ and 5 otherwise.

$C_4 = 32,$ $C_5 = 57.$

Finally, define array T1 of the size 83 and array T2 of the size 16:
T1={5,5,5,5,5,5,5,5,5,5,5,5,5,5,5,5,5,5,5,5,5,5,5,10, 16,14,12,11,10,10,10,10, 10,10,10,10,12,14,16,18,20,22,24, 26,28,30,32,33,33,32,32,31,31,30,29,28,27,26,25,24,23, 22,21,20,20,19,18,17,16,15,14,14,14,14,13,13,13,12,12,12, 12}
T2=[7,9,16,17,17,16,8,7,7,7,7,7,6,5,4]

The function F(x) may be calculated for nonnegative arguments using the array T1 as follows: F(x)=T1[round(x)] if x≥82 and F(x)=T1[82] otherwise.

The function G(x) may be calculated using the array T2 as follows:

$$G(x) = \frac{1}{82} T2[\text{round}(A*4096)]$$

if $$A*4096 \leq 15 \text{ and } G(x) = \frac{1}{82}*T2[15] \text{ otherwise.}$$

Dynamic Artifact Reduction

One visual defect in video encoding may be described as a flickering effect, meaning visible compression artifacts varying across frames in time in the same spatial area. A dynamic artifact reduction processing unit can be integrated into the control circuit 100 as a part of Processing Unit 4 to reduce this flickering effect in some coding situations.

Processing Unit 4 selects the optimal block coding parameters by comparing the corresponding mode costs. These teachings additionally provide for a smooth area detection unit and multiplication of the mode costs in the comparison procedure by values as described below.

The applicant has determined that visible flickering artifacts typically appear in smooth frame texture areas and are often caused by a non-optimal combination of texture prediction types in the same spatial block from frame to frame. One can also note that this defect is mostly visible in lower lit areas. Besides that, since lower hierarchy level B-frames (in H.264 or HEVC coding) usually have a higher quantization parameter, it is quite typical that this flashing effect is mostly visible due to severe deviation of the texture prediction in low hierarchy level B-frames from that of higher hierarchy level frames. For all frame types visible compression artifacts may also be caused by using directional (not planar or DC) intra predictions for smooth area blocks.

According to the applicant's observations, the flickering effect may be significantly reduced in such conditions by using only blocks of inter bi-directional type in B-frames or of planar intra type.

It is know that the compression efficiency maximizing block decision for a given spatial area requires choosing the block type which minimizes the so called RD cost defined as $R+\lambda*D$ where R is the estimated number of bits needed for coding the block (i.e., the "rate"), D is the coding distortion determined as the sum of square differences between the original and the reconstructed block pixels, and $\lambda$ is a pre-defined constant (the Lagrange multiplier). Therefore, choosing only bi-directional or planar intra blocks for the whole frame area may lead to significant compression efficiency degradation because those block types are not necessarily optimal in the sense of RD-cost minimization.

The following approach can reduce the flickering effect with this consequence in mind.

First, this approach provides for detecting relatively smooth texture areas in the frame texture (as described in more detail below). Then, for smooth texture areas so detected this approach provides for excluding directional intra prediction block types and choosing the block type that minimizes the value $C=\alpha*(R+\lambda*D)$ where the multiplier $\alpha$ is defined as $$\alpha = \begin{cases} 1 & \text{for bi-directional block type} \\ 1.5 & \text{for inter unidirectional block type} \\ 2 & \text{for intra block type} \end{cases}$$

The control circuit 100 can be configured to embody the smooth area detection unit as follows.

All pixel luminance values are assumed to have bit depth 8. If they have bit depth other than 8 then they can be scaled to bit depth 8 before applying the calculations below. All array indexing starts from zero.

Let P be a two-dimensional N×N array of texture block luminance component values P(j,k) where j=0 . . . N−1, k=0 . . . N−1.

$$\text{Let } DX(x,y) = \frac{\sum_{k=0}^{8}\sum_{j=0}^{8} P(4*(x+1)+j, 4*y+k) - \sum_{k=0}^{8}\sum_{j=0}^{8} P(4*x+j, 4*y+k)}{16}$$

$$DY(x,y) = \frac{\sum_{k=0}^{8}\sum_{j=0}^{8} P(4*x+j, (4*y+1)+k) - \sum_{k=0}^{8}\sum_{j=0}^{8} P(4*x+j, k)}{16}$$

HtstH—histogram array of the size 8; if j≠7 the element HtstH[j] is equal to the number of (x,y) integer pairs satisfying the conditions $$|DX(x,y)| = j, x \in \left[0, \frac{N}{4}-2\right], y \in \left[0, \frac{N}{4}-1\right];$$

if j=7 the element HtstH[j] equals to the number of (x,y) integer pairs satisfying the conditions $$|DX(x,y)| \geq j, x \in \left[0, \frac{N}{4}-2\right], y \in \left[0, \frac{N}{4}-1\right];$$

HtstV—histogram array of the size 8; if j≠7 the element HtstV[j] equals to the number of (x,y) integer pairs satisfying the conditions $$|DY(x,y)| = j, x \in \left[0, \frac{N}{4}-1\right], y \in \left[0, \frac{N}{4}-2\right];$$

if j=7 the element HtstV[j] equals to the number of (x,y) integer pairs satisfying the conditions $$|DX(x,y)| \geq j, x \in \left[0, \frac{N}{4}-1\right], y \in \left[0, \frac{N}{4}-2\right];$$

CH—cumulative histogram array of the size 7; CH[0]= HtstH[7]*2, CH[j]=CH[j−1]+2*HtstH[7−j].

CV—cumulative histogram array of the size 7; CV[0]= HtstV[7]*2, CV[j]=CV[j−1]+2*HtstV[7−j].

By one approach one can use the following criterion for smooth texture block detection.

Block P is considered a smooth texture block if for all j∈[0; 6] the following inequalities are satisfied:
CH[j]≤T[j], CV[j]≤T[j].

The thresholds array T is the parameter of the algorithm.

Besides the algorithm itself, it can be useful to use the following values of the array T elements:

$$T = \left[0, \frac{576}{N*(N-4)}, \frac{960}{N*(N-4)}, \frac{2500}{N*(N-4)}, \frac{4600}{N*(N-4)}, \frac{4600}{N*(N-4)}, \frac{4600}{N*(N-4)}\right]$$

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. An apparatus comprising:
   a block coding control circuit configured to:
   receive video information to be encoded;
   use a particular rounding control value when processing the video information;
   detect when color banding occurs when processing the video information using the particular rounding control value and responsively reprocess the video information using a different rounding control value;
   wherein the block coding control circuit includes a texture processor configured to conduct:
      texture block regular processing to calculate reconstructed pixels and quantized texture coefficients wherein a rounding parameter R value for a corresponding quantization procedure is chosen based on rate-distortion optimization;
      repeated texture block regular processing to calculate the reconstructed pixels and quantized texture coefficients with a rounding parameter R equal to a default value when color banding artifacts are detected.

2. The apparatus of claim 1 wherein the block coding control circuit is configured to process a two-dimensional texture block of the size N×N with block pixels denoted as P(j,k) which classifies the block as a block with potential color banding when the following conditions are satisfied simultaneously:

AvgS≥$C_1$
   AvgS≤$C_2$
   $N_2$<$C_3$
   (F(AvgS)<$C_4$) OR (A≠0) OR (AvgS>$C_5$)
   A<F(AvgS)
   V<G(A)

wherein $$V = \frac{N_1 \cdot D2X - DX^2}{N_1^2 - N_1} + \frac{N_1 \cdot D2Y - DY^2}{N_1^2 - N_1},$$

$$A = \frac{DX^2 + DY^2}{N_1^2},$$

$$AvgS = \frac{\sum_{k=m}^{N-1-m} \sum_{j=m}^{N-1-m} P(j,k)}{(N-2m)^2},$$

$$DX = \sum_{(j,k) \in S_1} (P(j+1,k) - P(j,k)),$$

$$DY = \sum_{(j,k) \in S_1} (P(j,k+1) - P(j,k)),$$

$$D2X = \sum_{(j,k) \in S_1} (P(j+1,k) - P(j,k))^2,$$

$$D2Y = \sum_{(j,k) \in S_1} (P(j,k+1) - P(j,k))^2,$$

$S_1$ is the set of index pairs (j,k) for which |dX(j,k)|≤1 and |dY(j,k)|≤1 for j,k=0 . . . N $S_2$ is the set of index pairs (j,k) for which |dX(j,k)|>1 or |dY(j,k)|>1 for j,k=0 . . . N $N_1$ is the number of elements in $S_1$ $N_2$ is the number of elements in $S_2$ where pre-defined constants m, $C_1$, $C_2$, $C_3$, $C_4$, $C_5$ and functions F(AvgS) and G(AvgS) are the parameters employed by the block coding control circuit when processing the two-dimensional texture block.

3. The apparatus of claim 1 wherein the block coding control circuit is configured to transform coefficients quantization according to the formula $$C_{quantized} = \frac{C_{init} * M + R}{D}$$

in which the division operation is done with rounding to the nearest smaller absolute value integer, $C_{init}$ is the initial coefficient value, M, D are external constants of quantization, and wherein the default value for the rounding parameter R equals $$\frac{D}{2}.$$

4. The apparatus of claim 1 wherein the block coding control circuit has a plurality of different intra prediction types, including a planar intra prediction type, available to use when encoding the video information and wherein the block coding control circuit is further configured to determine when the planar intra prediction type can be employed without testing use of all of the plurality of different intra prediction types.

5. The apparatus of claim 4 wherein the block coding control circuit is configured to determine when the planar intra prediction type can be employed without testing use of all of the plurality of different intra prediction types by, at least in part:

calculating for a two-dimensional texture block of the size N×N with block pixels denoted as P(j,k) the following characteristics:

$$DX(x,y) = \frac{\sum_{k=0}^{3} \sum_{j=0}^{3} P(4*(x+1)+j, 4*y+k) - \sum_{k=0}^{3} \sum_{j=0}^{3} P(4*x+j, 4*y+k)}{16},$$

$$DY(x,y) = \frac{\sum_{k=0}^{3} \sum_{j=0}^{3} P(4*x+j, (4*y+1)+k) - \sum_{k=0}^{3} \sum_{j=0}^{3} P(4*x+j, k)}{16}$$

$$DXX = \sum_{k=0}^{N-1} \sum_{j=0}^{N-1} (P(j+1,k) - P(j-1,k))^2$$

-continued $$DYY = \sum_{k=0}^{N-1}\sum_{j=0}^{N-1}(P(j,k+1) - P(j,k-1))^2$$

$$DXY = \sum_{k=0}^{N-1}\sum_{j=0}^{N-1}(P(j+1,k) - P(j-1,k))*(P(j,k+1) - P(j,k-1))$$

$$Cmpl = \sum_{y=0}^{\frac{N}{4}-1}\sum_{x=0}^{\frac{N}{4}-1} DX(x,y)^2 + DY(x,y)^2$$

$$V0 = \text{round}\left(\frac{20*|DXX - DYY|}{(DXX + DYY)}\right)$$

$$V1 = \text{round}\left(\frac{40*|DXY|}{(DXX + DYY)}\right)$$

$$AngleStrength = \sqrt{V0^2 + V1^2}$$

and
to halt intra prediction type testing when the following condition is satisfied:

AngleStrength<$T(Cmpl,N)$;

wherein threshold value T(Cmpl,N) is an internal parameter that depends only on block size N and a calculated value of Cmpl.

6. The apparatus of claim 5 wherein the block coding control circuit is further configured to store internal data arrays comprising:
Scale={84, 84, 84, 84, 14, 3, 3}, size=7
CL={0,1,1,1,1,1,1,2,2,2,2,2,2,3,3,3,3,3,3,3,3,3,3,3,3,3,
3,3,3,3,4,4,4,4,4, 4,4,4,4,4,4,4,4,4,4,4,4,4,4,4,4,4,4,4,
4,4,4,4,4,5,5,5,5,5,5,5,5,5,5, 5,5,5,5,5,5,5,5,5,5,5,5,
5,5,5,5,5,5,5,5,5,5,5,5,5,5,5,5,5,5,5,5,5,5,5, 5,5,5,5,5,
5,5,5,5,6,6,6,6,6,6,6,6,6,6,6,6,6,6,6,6,6,6,6,6,6,6,6,6,
6, 6,6,6,6,6,6,6,6,6,6,6,6,6,6,6,6,6,6,6,6,6,6,6,6,6,6,6,
6,6,6,6,6,6,6,6, 6,6,6,6,6,6,6,6,6,6,6,6,6,6,6,6,6,6,6,6,
6,6,6,6,6,6,6,6,6,6,6,6,6,7,7, 7,7,7,7,7,7,7,7,7,7,7,7,7,
7,7,7,7,7,7,7,7,7,7,7,7,7,7,7,7,7, 7,7,7,7,7,7,7,
7,7,7,7,7,7,7,7,7,7,7,7,7,7,7,7,7,7,7,7,7,7,7,7,7,7,7,7,
7,7,7,7,7,7,7,7,7,7,7,7,7,7,7,7,7,7,7,7,7,7,7,7,7,7,7,7,
7,7,7,7,7,7, 7,7,7,7,7,7,7,7,7,7,7,7,7,7,7,7,7,7,7,7,7,7,
7,7,7,7,7,7,7,7,7,7,7, 7,7,7,7,7,7,7,7,7,7,7,7,7,7,7,7,7,
7,7,7,7,7,7,7}, size=383
B={-1,0,6,12,30,61,117,213,382,677,1194,2099,3682, 6453,11302,19788,34638}, size=17
T8={16,19,11,10,6,7,8,7,9,10,5,9,11,14,13,12,12}, size=17
T16={19,19,19,9,12,9,10,9,9,8,9,8,7,9,10,13,9}, size=17
T32={19,19,19,19,19,19,6,6,7,5,4,10,10,9,7,12,14}, size=17
and to calculate T(Cmpl,N) as $$T(Cmpl, N) = \begin{cases} TN[CL[CmpS]], & CmpS < 383 \\ TN[d], & CmpS \geq 383 \end{cases}$$

wherein TN is an array of size 17 which is T8 if N≤8, to T16 if N=16 and to T32 otherwise;
calculate CmpS as CmpS=round($Cmpl$*Scale[round($\log_2 N$)]/14);

index d defined to be 16 if CmpS>B[16] and to satisfy the condition B[d]≤CmpS<B[d+1] otherwise.

7. The apparatus of claim 1 wherein the block coding control circuit is further configured to:
select block coding parameters, at least in part, by comparing corresponding mode costs;
detect a smooth area in the video information;
modify the mode costs as a function of having detected the smooth area.

8. The apparatus of claim 7 wherein the block coding control circuit is configured to, upon detecting the smooth area:
exclude directional intra prediction block types and choose a block type that minimizes C=α*(R+λ*D) where the multiplier α is defined as $$\alpha = \begin{cases} 1 & \text{for bi-directional block type} \\ 1.5 & \text{for inter unidirectional block type} \\ 2 & \text{for intra block type} \end{cases}$$

9. The apparatus of claim 8 wherein the block coding control circuit is configured to process two-dimensional texture block of the size N×N with block pixels denoted as P(j,k) and is further configured to classify a block area as smooth when the following inequalities hold:

$CH[j] \leq T[j]$, $CV[j] \leq T[j]$, wherein j=0 . . . 6, the values of T[j] are internal parameters employed by the block coding control circuit and the arrays CH, CV are derived by calculating the values $$DX(x, y) = \frac{\sum_{k=0}^{3}\sum_{j=0}^{3} P(4*(x+1)+j, 4*y+k) - \sum_{k=0}^{3}\sum_{j=0}^{3} P(4*x+j, 4*y+k)}{16},$$

$$DY(x, y) = \frac{\sum_{k=0}^{3}\sum_{j=0}^{3} P(4*x+j, (4*y+1)+k) - \sum_{k=0}^{3}\sum_{j=0}^{3} P(4*x+j, k)}{16}$$

for all $$x \in \left[0, \frac{N}{4} - 2\right], y \in \left[0, \frac{N}{4} - 1\right],$$

constructing histograms HistH for the calculated values of |DX| clipped to the interval [0,7], HistV for the calculated values of |DY| clipped to the interval [0,7] and calculating the elements of the cumulated histograms CH, CV as CH[0]=HistH[7]*2,CH[k]=CH[k-1]+2*HistH[7-k],
  k=0 . . . 6, CV[0]=HistV[7],CV[k]=CV[k-1]+2*HistV[7-k],
  k=0 . . . 6.

10. A method comprising:
by a block coding control circuit:
receiving video information to be encoded;
using a particular rounding control value when processing the video information;
detecting when color banding occurs when processing the video information using the particular rounding control value and responsively reprocessing the video information using a different rounding control value;

performing texture block regular processing to calculate reconstructed pixels and quantized texture coefficients wherein a rounding parameter R value for a corresponding quantization procedure is chosen based on rate-distortion optimization; and performing repeated texture block regular processing to calculate the reconstructed pixels and quantized texture coefficients with a rounding parameter R equal to a default value when color banding artifacts are detected.

11. The method of claim 10 further comprising:

processing a two-dimensional texture block of the size N×N with block pixels denoted as P(j,k) which classifies the block as a block with potential color banding when the following conditions are satisfied simultaneously:

AvgS≥$C_1$
AvgS≤$C_2$
$N_2$<$C_3$
(F(AvgS)<$C_4$) OR (A≠0) OR (AvgS>$C_5$)
A<F(AvgS)
V<G(A)
wherein $$V = \frac{N_1 \cdot D2X - DX^3}{N_1^2 - N_1} + \frac{N_1 \cdot D2Y - DY^3}{N_1^2 - N_1},$$

$$A = \frac{DX^3 + DY^3}{N_1^3},$$

$$AvgS = \frac{\sum_{k=m}^{N-1-m} \sum_{j=m}^{N-1-m} P(j,k)}{(N-2m)^2},$$

$$DX = \sum_{(j,k) \in S_1} (P(j+1,k) - P(j,k)),$$

$$DY = \sum_{(j,k) \in S_1} (P(j,k+1) - P(j,k)),$$

$$D2X = \sum_{(j,k) \in S_1} (P(j+1,k) - P(j,k))^2,$$

$$D2Y = \sum_{(j,k) \in S_1} (P(j,k+1) - P(j,k))^2,$$

$S_1$ is the set of index pairs (j,k) for which |dX(j,k)|≤1 and |dY(j,k)|≤1 for j,k=0 . . . N
$S_2$ is the set of index pairs (j,k) for which |dX(j,k)|>1 or |dY(j,k)|>1 for j,k=0 . . . N
$N_1$ is the number of elements in $S_1$
$N_2$ is the number of elements in $S_2$
where pre-defined constants m, $C_1$, $C_2$, $C_3$, $C_4$, $C_5$ and functions F(AvgS) and G(AvgS) are the parameters employed by the block coding control circuit when processing the two-dimensional texture block.

12. The method of claim 10 further comprising:
transforming coefficients quantization according to the formula $$C_{quantized} = \frac{C_{init} * M + R}{D}$$

in which the division operation is done with rounding to the nearest smaller absolute value integer, $C_{init}$ is the initial coefficient value, M, D are external constants of quantization, and wherein the default value for the rounding parameter R equals $$\frac{D}{2}.$$

13. The method of claim 10 wherein the block coding control circuit has a plurality of different intra prediction types, including a planar intra prediction type, available to use when encoding the video information and wherein the method further comprises:

determining when the planar intra prediction type can be employed without testing use of all of the plurality of different intra prediction types.

14. The method of claim 13 wherein determining when the planar intra prediction type can be employed without testing use of all of the plurality of different intra prediction types comprises determining when the planar intra prediction type can be employed without testing use of all of the plurality of different intra prediction types by, at least in part:

calculating for a two-dimensional texture block of the size N×N with block pixels denoted as P(j,k) the following characteristics:

$$DX(x,y) = \frac{\sum_{k=0}^{3}\sum_{j=0}^{3} P(4*(x+1)+j, 4*y+k) - \sum_{k=0}^{3}\sum_{j=0}^{3} P(4*x+j, 4*y+k)}{16},$$

$$DY(x,y) = \frac{\sum_{k=0}^{3}\sum_{j=0}^{3} P(4*x+j, (4*y+1)+k) - \sum_{k=0}^{3}\sum_{j=0}^{3} P(4*x+j, k)}{16}$$

$$DXX = \sum_{k=0}^{N-1}\sum_{j=0}^{N-1} (P(j+1,k) - P(j-1,k))^2$$

$$DYY = \sum_{k=0}^{N-1}\sum_{j=0}^{N-1} (P(j,k+1) - P(j,k-1))^2$$

$$DXY = \sum_{k=0}^{N-1}\sum_{j=0}^{N-1} (P(j+1,k) - P(j-1,k)) * (P(j,k+1) - P(j,k-1))$$

$$Cmpl = \sum_{y=0}^{\frac{N}{4}-1}\sum_{x=0}^{\frac{N}{4}-1} DX(x,y)^2 + DY(x,y)^2$$

$$V0 = \text{round}\left(\frac{20 * |DXX - DYY|}{(DXX + DYY)}\right)$$

$$V1 = \text{round}\left(\frac{40 * |DXY|}{(DXX + DYY)}\right)$$

$$AngleStrength = \sqrt{V0^2 + V1^2}$$

and to halt intra prediction type testing when the following condition is satisfied:

AngleStength<T(Cmpl,N);

wherein threshold value T(Cmpl,N) is an internal parameter that depends only on block size N and a calculated value of Cmpl.

15. The method of claim 14 further comprising:
storing internal data arrays comprising:
Scale={84, 84, 84, 84, 14, 3, 3}, size=7
CL={0,1,1,1,1,1,1,2,2,2,2,2,2,3,3,3,3,3,3,3,3,3,3,3,3,3,
3,3,3,4,4,4,4,4, 4,4,4,4,4,4,4,4,4,4,4,4,4,4,4,4,4,4,4,4,
4,4,4,5,5,5,5,5,5,5,5,5,5, 5,5,5, 5,5,5,5,5,5,5,5,5,5,5,5,5,
5,5,5,5,5,5,5,5,5,5,5,5,5,5,5,5, 5,5,5, 5,5,5,5,5,5,6,6,6,
6,6,6,6,6,6,6,6,6,6,6,6,6,6,6,6,6,6,6,6,6, 6,6,6,6,6,6,6,6,
6,6,6,6,6,6,6,6,6,6,6,6,6,6,6,6,6,6,6,6,6,6,6,6,6,6,6, 6,6,6,
6,6,6,6,6,6,6,6,6,6,6,6,6,6,6,6,6,6,6,6,6,6,6,6,6,6,6,6,6,7,
7, 7,7,7,7,7,7,7,7,7,7,7,7,7,7,7,7,7,7,7,7,7,7,7,7,7,7,7,
7,7,7,7,7,7, 7,7,7,7,7,7,7,7,7,7,7,7,7,7,7,7,7,7,7,7,7,7,7,
7,7,7,7,7,7,7,7,7,7,7, 7,7,7,7,7,7,7,7,7,7,7,7,7,7,7,7,7,7,
7,7,7,7,7,7,7,7,7,7,7,7,7,7, 7,7,7,7,7,7,7,7,7,7,7,7,7,7,
7,7,7,7,7,7,7,7,7,7,7,7,7,7,7,7,7,7, 7,7,7,7,7,7,7,7,7,
7,7,7,7,7,7,7,7,7,7,7,7}, size=383
B={−1,0,6,12,30,61,117,213,382,677,1194,2099,3682,
6453,11302,19788,34638}, size=17
T8={16,19,11,10,6,7,8,7,9,10,5,9,11,14,13,12,12}, size=17
T16={19,19,19,9,12,9,10,9,9,8,9,8,7,9,10,13,9}, size=17
T32={19,19,19,19,19,19,6,6,7,5,4,10,10,9,7,12,14},
size=17
and calculating T(Cmpl,N) as $$T(Cmpl, N) = \begin{cases} TN[CL[CmpS]], & CmpS < 383 \\ TN[d], & CmpS \geq 383 \end{cases}.$$

wherein TN is an array of size 17 which is T8 if N≤8, to T16 if N=16 and to T32 otherwise;
calculate CmpS as $CmpS = \text{round}(Cmpl * \text{Scale}[\text{round}(\log_2 N)]/14);$ index d defined to be 16 if CmpS>B[16] and to satisfy the condition B[d]≤CmpS<B[d+1] otherwise.

16. The method of claim 10 further comprising:
selecting block coding parameters, at least in part, by comparing corresponding mode costs;
detecting a smooth area in the video information; and
modifying the mode costs as a function of having detected the smooth area.

17. The method of claim 16 further comprising:
upon detecting the smooth area:
excluding directional intra prediction block types and choose a block type that minimizes C=α*(R+λ*D) where the multiplier α is defined as $$\alpha = \begin{cases} 1 & \text{for bi-directional block type} \\ 1.5 & \text{for inter unidirectional block type} \\ 2 & \text{for intra block type} \end{cases}.$$

18. The method of claim 17 further comprising:
processing two-dimensional texture blocks of the size N×N with block pixels denoted as P(j,k); and
classifying a block area as smooth when the following inequalities hold:

$CH[j] \leq T[j],$ $CV[j] \leq T[j],$ wherein j=0 ... 6, the values of T[j] are internal parameters employed by the block coding control circuit and the arrays CH, CV are derived by calculating the values $$DX(x, y) = \frac{\sum_{k=0}^{3}\sum_{j=0}^{3} P(4*(x+1)+j, 4*y+k) - \sum_{k=0}^{3}\sum_{j=0}^{3} P(4*x+j, 4*y+k)}{16},$$

$$DY(x, y) = \frac{\sum_{k=0}^{3}\sum_{j=0}^{3} P(4*x+j, (4*y+1)+k) - \sum_{k=0}^{3}\sum_{j=0}^{3} P(4*x+j, k)}{16}$$

for all $x \in \left[0, \frac{N}{4} - 2\right],$ $y \in \left[0, \frac{N}{4} - 1\right],$ constructing histograms HistH for the calculated values of |DX| clipped to the interval [0,7], HistV for the calculated values of |DY| clipped to the interval [0,7]; and
calculating the elements of the cumulated histograms CH, CV as $CH[0]=\text{Hist}H[7]*2, CH[k]=CH[k-1]+2*\text{Hist}H[7-k],$
$k=0 \ldots 6,$ $CV[0]=\text{Hist}V[7]*2, CV[k]=CV[k-1]+2*\text{Hist}V[7-k],$
$k=0 \ldots 6.$

* * * * *